(12) United States Patent
Stayton et al.

(10) Patent No.: US 7,598,905 B2
(45) Date of Patent: Oct. 6, 2009

(54) SYSTEMS AND METHODS FOR MONITORING TRANSPONDER PERFORMANCE

(75) Inventors: Gregory T. Stayton, Peoria, AZ (US); Stephen P. Williams, Phoenix, AZ (US)

(73) Assignee: Aviation Communication & Surveillance Systems LLC, Phoenix, AZ (US)

( * ) Notice: Subject to any disclaimer, the term of this patent is extended or adjusted under 35 U.S.C. 154(b) by 41 days.

(21) Appl. No.: 11/946,825

(22) Filed: Nov. 28, 2007

(65) Prior Publication Data

US 2008/0150792 A1 Jun. 26, 2008

Related U.S. Application Data

(60) Provisional application No. 60/861,538, filed on Nov. 28, 2006.

(51) Int. Cl.
- *G01S 7/40* (2006.01)
- *G01S 13/74* (2006.01)
- *G01S 13/78* (2006.01)
- *G01S 13/00* (2006.01)

(52) U.S. Cl. .............. 342/174; 342/29; 342/30; 342/32; 342/36; 342/37; 342/42; 342/43; 342/51; 342/165; 342/173; 342/175; 342/195

(58) Field of Classification Search ......... 342/29–51, 342/165–175, 195, 82–103, 118, 125, 126, 342/450–465; 370/334; 340/945, 500, 501, 340/505, 514–516, 825, 10.1–10.6
See application file for complete search history.

(56) References Cited

U.S. PATENT DOCUMENTS

| | | | | |
|---|---|---|---|---|
| 3,728,728 A | * | 4/1973 | Vogel et al. ............... 342/174 |
| 3,803,607 A | * | 4/1974 | Robinson .................. 342/172 |
| 4,017,856 A | * | 4/1977 | Wiegand .................. 342/174 |
| 4,041,490 A | * | 8/1977 | Watt ....................... 342/174 |
| 4,042,926 A | * | 8/1977 | Anderson et al. .......... 342/173 |
| 4,333,081 A | * | 6/1982 | Hofgen .................... 342/173 |
| 4,532,516 A | * | 7/1985 | Frampton et al. ........... 342/47 |
| 4,590,477 A | * | 5/1986 | Regnier et al. ............ 342/173 |
| 4,654,810 A | * | 3/1987 | Becker et al. .............. 342/47 |
| 4,970,510 A | | 11/1990 | Stelling |
| 5,416,466 A | | 5/1995 | Malvaso et al. |
| 5,469,172 A | * | 11/1995 | Schleder et al. ........... 342/174 |
| 5,532,698 A | * | 7/1996 | Nielsen et al. ............ 342/174 |
| 5,689,266 A | * | 11/1997 | Stelling et al. ............ 342/165 |
| 5,754,942 A | | 5/1998 | Wachs |
| 6,094,055 A | | 7/2000 | Dosdall et al. |
| 6,344,820 B1 | * | 2/2002 | Shiomi et al. ............. 342/174 |
| 6,392,587 B1 | * | 5/2002 | Langbecker et al. ........ 342/173 |
| 6,529,156 B2 | * | 3/2003 | Morchel et al. ............ 342/172 |
| 6,570,527 B1 | * | 5/2003 | Lindskog et al. .......... 342/174 |
| 6,693,584 B2 | * | 2/2004 | Horst et al. ............... 342/165 |

(Continued)

*Primary Examiner*—Bernarr E Gregory
(74) *Attorney, Agent, or Firm*—Allen J. Moss; Lucius L. Lockwood; Squire, Sanders & Dempsey LLP (57) ABSTRACT

There are presented various approaches to monitor performance of RF systems and circuitry such as those used in aircraft transponders. Such monitoring may be designed to verify operational performance of transponders as set forth by FAA regulations, or may be used to periodically or continually monitor integrity of transponder performance. Data may be collected by such periodic or continual monitoring, and may be analyzed to identify potentially troublesome trends in transponder performance, allowing early intervention or repair, if warranted.

28 Claims, 8 Drawing Sheets

U.S. PATENT DOCUMENTS 6,747,594 B2 * 6/2004 Lindskog et al. ............ 342/174
6,965,755 B1 11/2005 Barrett
2002/0071406 A1 * 6/2002 Bursztejn et al. ............ 370/334
2002/0186163 A1 * 12/2002 Morchel et al. ............. 342/174

* cited by examiner

Since Fref = Find, M = N.

Since 100MHz (Fif) / 10MHz = 10, the ratio between P and Q will be a multiple of 10.

Example comparison formula:

119 x (M/N) x Error1 + P/Q * Error2 < 1MHz.

SYSTEMS AND METHODS FOR MONITORING TRANSPONDER PERFORMANCE

CROSS REFERENCE TO RELATED APPLICATIONS

This application is related to and claims priority from U.S. provisional patent application No. 60/861,538, filed Nov. 28, 2006 and entitled "Systems and Methods for Testing ATC Transponders," the disclosure of which is fully incorporated by reference herein for all purposes.

BACKGROUND OF THE INVENTION

1. Field of the Invention

The present invention relates to avionics systems, and more particularly, to systems and methods for monitoring and testing performance of transponders such as air traffic control-related transponders installed in aircraft.

2. Description of the Related Art

Travel by aircraft is generally a safe and efficient way for travelers to reach remote destinations. Over the years, as the popularity of air travel has dramatically increased, the need for techniques for safely managing the flow of aircraft has also risen. To address air traffic safety issues, aircraft have been equipped with avionics equipment such as transponders that assist air traffic controllers in identifying, tracking, and managing aircraft in flight. Transponders provide air traffic controllers with information such as aircraft identification, altitude and other aircraft-specific data, allowing controllers to more effectively manage air traffic.

To ensure that avionics continue to function as originally designed, the Federal Avionics Administration (FAA) has established tests that must be performed on aircraft equipment on a periodic basis. Aircraft equipped with ATC transponders (ATCRBS or Mode-S transponders, for example) must pass a battery of tests every 24 months (Federal Aviation Regulations Part 43, Appendix F). The tests include, among other items, verification of transponder output power, transponder output frequency, and transponder receiver sensitivity. Currently, this testing is accomplished through ramp testing or bench testing, and expensive equipment may be required to complete this hours-long time-consuming process. Further, current testing is performed at required test intervals, and it may be difficult for aircraft operators to know whether installed transponders are operating correctly and within established tolerances until failure is detected when the periodic test is performed. What is needed, then, is a means to test transponder performance without the use of dedicated external test equipment. What is also needed is a means to monitor performance of a transponder at periodic intervals or on a continuous or semi-continuous basis. What is also needed is a method to monitor trends in transponder performance and identify when operating parameters are deviating from desired ranges.

SUMMARY OF THE INVENTION

There are presented various approaches to monitor performance of RF systems and circuitry such as those used in aircraft transponders. Such monitoring may be designed to verify operational performance of transponders as set forth by FAA regulations, or may be used to periodically or continually monitor integrity of transponder performance. Data may be collected by such periodic or continual monitoring, and may be analyzed to identify potentially troublesome trends in transponder performance, allowing early intervention or repair, if warranted.

In one embodiment, a method is provided for monitoring performance of a transponder, the method including synthesizing a signal for broadcast, the signal comprising air traffic control information, transmitting the signal from a directional antenna, sensing coupled electromagnetic signals from the antenna, routing the coupled electromagnetic signals to a receiver; and analyzing the coupled electromagnetic signals to determine whether the signals are in compliance with a predetermined performance range. The predetermined performance range may correspond with transponder performance criteria indicating acceptable performance under United States FAA regulations. The directional antenna may be configured to transmit a substantially omindirectional signal, supporting the necessary operation of the transponder. Further, analyzing the coupled electromagnetic signals may include analyzing an attenuation in the amplitude of the transmitted signal, including analyzing peak output power of the transponder. The analysis may also include sensing a phase of the coupled electromagnetic signals, comparing the sensed phase to a transmitted phase to determine a phase drift; and determining, based on the phase drift, whether the radiated RF amplitude of the transmitted signal is potentially affected by a poor cable, cable connector, antenna, or other transmit path series elements. Additional or alternate analysis for phase changes may be undertaken, including determining whether sensing a short-term phase drift, long term phase drift or abrupt phase change has occurred.

In various embodiments, various transponder performance values are measured, stored, and compared with previously determined or stored measurements of the system when calibrated. In this way, trends analysis assists with identification of potentially faulty hardware, software or systems. For example in certain embodiments, records are formatted for storage, the records including a timestamp for record creation and at least one performance parameter characterizing transponder operating performance, and comparing a plurality of stored records to identify a transponder performance trend. The records may contain any number of fields or data types necessary to analyze or validate transponder performance. For example, the transponder performance trends may include at least a frequency drift analysis, an amplitude variation analysis, or an output power variation analysis, and trend analysis may also include comparisons to measured signals broadcast from ground stations or other external sources. Also, frequencies may be verified in various embodiments, for example, analyzing coupled electromagnetic signals may include determining whether the frequency of the transmitted signal is within a predetermined range.

In another embodiment, a method is provided for monitoring performance of a transponder, including synthesizing a signal for transmission, the signal comprising air traffic control information; transmitting the signal from an antenna; sensing coupled electromagnetic signals from the antenna; analyzing the coupled electromagnetic signals to determine a transmitted signal frequency; comparing the transmitted signal frequency to a reference signal frequency to determine whether the frequency range satisfies a predetermined performance threshold. The frequency of the reference signal may correspond to a carrier frequency for received transponder interrogations. In an alternate embodiment, ground stations (or external signals such as those provided by other aircraft) may provide the reference signal frequency. In this case, the reference signal frequency is verified by obtaining a plurality of signal measurements from at least one of a ground station and a second transponder; a mean frequency or best frequency of the plurality of signal measurements is calculated or determined; and the mean or best frequency is compared to the reference signal frequency to determine whether the reference signal frequency is within a predetermined average error range.

Frequency comparisons may be carried out through any number of techniques. For example, comparing the frequency range to the reference frequency further may comprise obtaining a beat note from differential analysis of the transmitted signal frequency and the reference signal frequency. In some embodiments, the coupled electromagnetic signals are downconverted to an IF frequency for comparison.

In another embodiment, a method is provided for monitoring performance of a transponder, the method including receiving a plurality of signals in a receiver, the signals comprising air traffic control information; analyzing the plurality of interrogation signals to obtain a measured noise performance criterion and a measured minimum triggering level (MTL) performance criterion; determining that the measured receiver sensitivity performance criterion and the measured MTL performance criterion are within respective predetermined thresholds when at least one interrogation signal was received at a predetermined minimum triggering level MTL within a predetermined number of flight legs at a predetermined minimum distance from own aircraft; and a receiver is detecting noise in the form of spurious pulse data at a level below MTL. The signals may, for example, comprise received ATCRBS air traffic interrogations, or received Mode S air traffic interrogations. Further, a plurality of Mode S replies may be synthesized for broadcast, the Mode S replies transmitted from an antenna; the coupled electromagnetic signals sensed from the antenna; and the coupled electromagnetic signals routed to the receiver. The plurality of signals may comprise the coupled electromagnetic signals.

The ability to detect noise below a predetermined MTL provides for another embodiment of the invention, so detecting such noise or spurious pulse data at a level below MTL may also include: finding no defined signal preamble in the plurality of signals within a predetermined period of time; and measuring invalid pulses below the predetermined MTL, where invalid pulses may be identified by a signal rise time that exceeds or lags a predetermined rise time criterion; a signal decay time that exceeds or lags a predetermined decay time criterion; a signal pulse width that that exceeds or lags a predetermined pulse width criterion; a variation in signal pulse amplitude that exceeds or lags a predetermined signal pulse amplitude criterion; or a variation in signal phase that that exceeds or lags a predetermined signal pulse phase criterion.

There is also provided a method for monitoring performance of a transponder, where the method includes: inputting a predetermined calibration signal into a receiver input of an RF circuit coupled to the transponder, the calibration signal having a predetermined minimum sensitivity level; sampling an output from the RF circuit to obtain a calibrated reference response signal; coupling a self test signal to the receiver input of the RF circuit; measuring a test response signal from the output of the RF circuit; modifying the self test signal until the test response signal is within a predetermined range of the calibrated reference response signal; and determining, based on the modified self test signal, the calibration signal, the calibrated reference response signal, and the test response signal that a receiver sensitivity criterion is within a predetermined threshold. Further, the method may include generating a second self test signal at the predetermined minimum sensitivity level; coupling the second self test signal to the receiver input of the RF circuit; and determining, based on the sampled output, whether the receiver sensitivity criterion is within a predetermined threshold. In various embodiments, the test signals may be applied during an offline test or verification time, or during transponder operation; for example, the coupling of the second self test signal to the receiver input of the RF circuit occurs when the RF circuit is configured to an operational mode.

Another embodiment provides for verifying output frequency through a method for monitoring performance of a transponder including: generating a reference frequency and an independent frequency; determining a frequency error based on a calculated difference between the reference frequency and the independent frequency; computing an allowed error based on a ratio of a maximum allowable output frequency deviation; and a desired output frequency divided by the reference frequency; and determining that the output frequency is within an acceptable range when the frequency error is within the allowed error. Multiple frequency sources may be used to confirm output frequency, for example, the frequency error in the above-described approach may further include a second error based on a calculated difference between a third frequency and the independent frequency.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

Reference will now be made in detail to the present exemplary embodiments of the invention, examples of which are illustrated in the accompanying drawings. Wherever possible, the same reference numbers will be used throughout the drawings to refer to the same or like parts.

DESCRIPTION OF THE EMBODIMENTS

The Federal Avionics Administration has mandated that aircraft transponders be tested every 24 calendar months. The regulations in FAR Part 43, Appendix F establish a number of performance criteria that must be verified. The performance criteria may include, among other things, verification of transponder output power, transponder output frequency, and transponder receiver sensitivity.

Embodiments of the present invention provide for automated testing and monitoring of aircraft transponders. Further, embodiments of the present invention allow storage of periodic performance criteria, comparison against known or desired values, and identification of performance trends.

RF Power Monitoring

Figure 1:
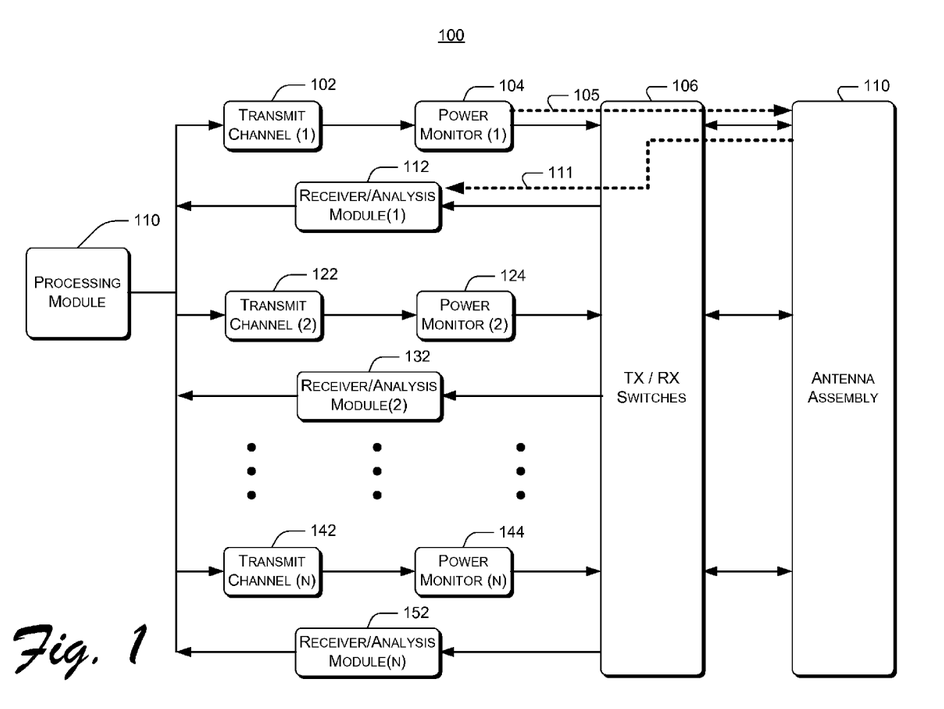
FIG. 1 illustrates a block diagram of one embodiment of the present invention where transponder signals being transmitted are coupled and fed back for analysis.

Turning to FIG. 1, a block diagram depicting an embodiment of a system of the present invention 100 is shown, where signals being transmitted are coupled and fed back for analysis. A processing module 110 may generate, receive, and analyze data regarding signals in the illustrated communication system. The module is coupled to inputs of a number of transmit channels (102, 122, and 142), and although three channels are shown, those of skill in the art recognize that more or fewer channels may be utilized. The transmit channels (102, 122, and 142) are coupled to power monitors 104, 124, and 144, which may also monitor signal continuity. In turn, the power monitors 104, 124, and 144 are coupled to a transmit/receive switch array 106, which allows intelligent routing of signals out of the system (transmit mode), into the system (receive mode), routing of signals out from one channel and into another, or a feedback arrangement as shown, where an output signal 105 is coupled to an antenna assembly 110, and sensed signals 111 which may comprise signals coupled from the antenna assembly 110 from the transmitted output signal 105 are fed back to a receiver module 112 for analysis. Those of skill in the art further appreciate that only one channel may be used for communication, or multiple channels may be utilized. The power received in the sensed signals 111 may be compared to a predetermined threshold output power level to analyze whether signals are being transmitted at the necessary output power. As the sensed signals 111 may be attenuated by a known amount, the sensed signals 111 may be compared to an attenuated power threshold to determine that the transponder is transmitting at the desired output power.

In an embodiment, the antenna assembly 110 may comprise a directional antenna. The phases of antenna assembly 110 may configured to operate as a directional antenna or the phase of the antenna assembly 110 may be alternately configured to operate as an omnidirectional antenna, depending on the signals being transmitted or received.

RF Output Frequency

Figure 2:
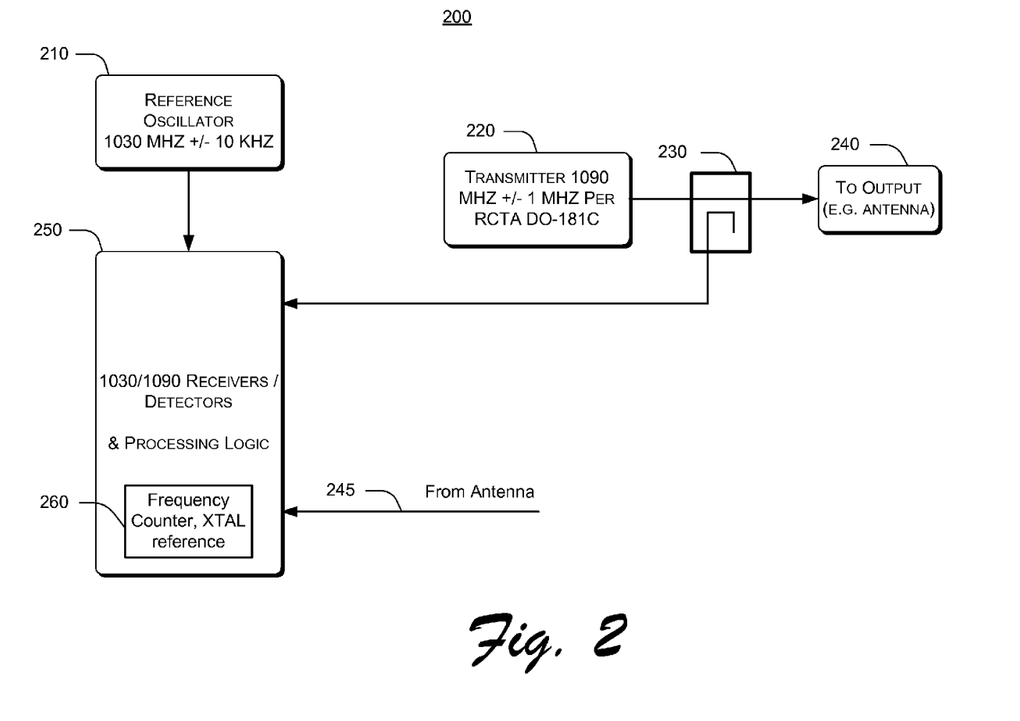
FIG. 2 illustrates a block diagram of one embodiment of the present invention for monitoring output frequency.

Turning to FIG. 2, a block diagram 200 illustrates one embodiment of the present invention for monitoring output frequency. A transmitter 220 generates a signal for presentation to the transmit/receive switch 240. The switch 240 may also comprise the switch matrix 106 illustrated in regards to FIG. 1. A coupler 230, senses signals being transmitted by the transmitter 220, and presents them to receivers, detectors and processing logic 250. The coupler 230 may comprise any device capable of sensing and coupling signals, such as an attenuator, a directional coupler, a direct connection, or other form of routing the output from the transmitter 220 back into the processing logic for frequency measurement. In one embodiment, such output comprises coupled 1090 MHz signals.

Output frequency may be measured and verified by using an oscillator with known integrity such as a 1030 MHz +/−10 KHz oscillator 210, which is coupled to the receiver detector processing logic 250 and compared to the 1090 MHz transmitted signal. This implementation provides several benefits, including the use of an oscillator of known integrity that is commonly available as a part of related avionics systems such as TCAS (Traffic alert and Collision Avoidance System). The reference oscillator's integrity may be confirmed by receiving a signal 245 from an antenna that was transmitted from a ground station (not shown) on a known frequency, and comparing the received signal frequency to the frequency of the reference oscillator.

Although the illustrated 1030 MHz reference oscillator 210 is outputting a different frequency than the 1090 MHz output 220 signal which is under test, the frequencies may be compared through a variety of techniques. For instance, the signal frequencies can be directly measured by an FPGA frequency counter, down converted and measured at an IF frequency, or used to create a difference RF signal (or a beat note) at a frequency such as 60 MHz to measure the output frequency from the 1090 MHz source 220.

In one implementation, several measurements would be made during several (such as 4) flight legs to determine an average error of the 1030 MHz internal reference 210. If this average error is within a predetermined range, then a determination can be made that the local 1030 MHz reference 210 is sufficiently accurate to verify the output frequency of the transponder. Signals broadcast from ground stations or other external sources may be continuously monitored, assuring an accurate frequency reference for comparison of transmitted signal frequencies.

In one implementation, if measurement of the signal received from the ground station shows that the frequency of the reference oscillator 210 is within 100 kHz, then it would be sufficient to be used to verify the transmission frequency of the output signal to FAR Part 43 regulations. For example, if the reference oscillator 210 is within 100 kHz of specification, then the output signal of the transponder may be analyzed to determine if the 1090 MHz transmitter is within 900 kHz of specification. Since the output 1090 MHz oscillator such as a Mode S oscillator is within 20 kHz by design, and since the MOPS requirement is +/−1 MHz, a tolerance of +/−900 kHz may be readily used. Put another way, the frequency counter reference crystal 260 of the processing logic 250 is validated by the 1030 MHz ground station measurement as is the 1030 MHz reference oscillator 210. A further check can be done by taking a predetermined number of 1090 MHz reply frequency measurements compared with own Transmitter 1090 MHz reference and averaging the results to see if own transmitter is within 900 kHz because most 1090 MHz transponders are well within 1+/− MHz of specified values due to crystal reference oscillators that are known to maintain accuracy to about +/−100 kHz.

Figure 8:
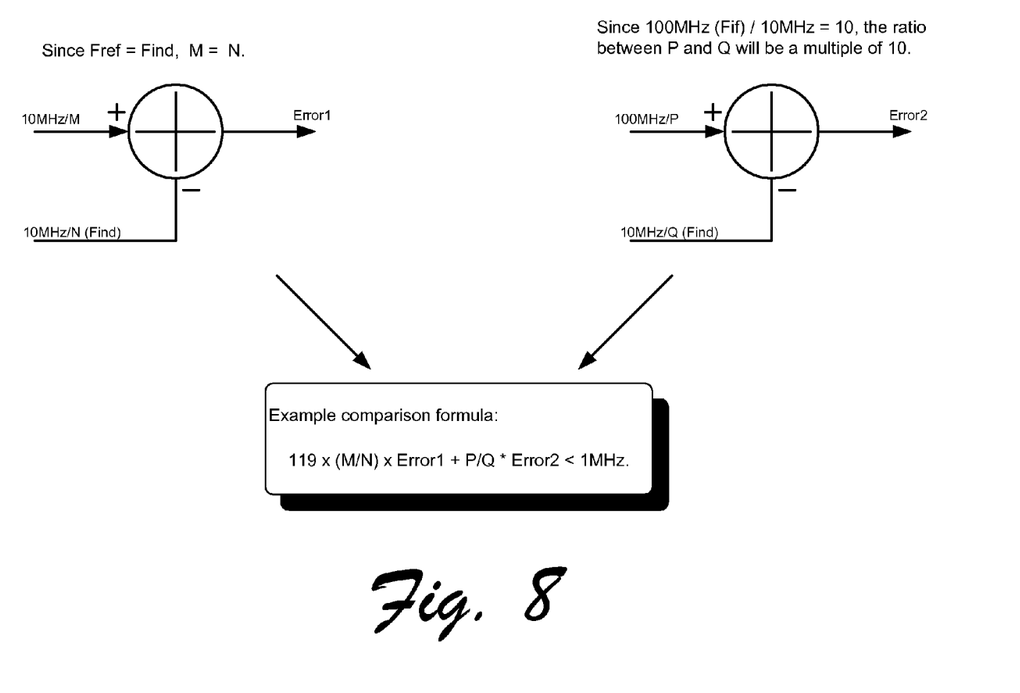
FIG. 8 illustrates exemplary approaches to determining whether frequency error of a transponder is within tolerable limits.
Figure 9:
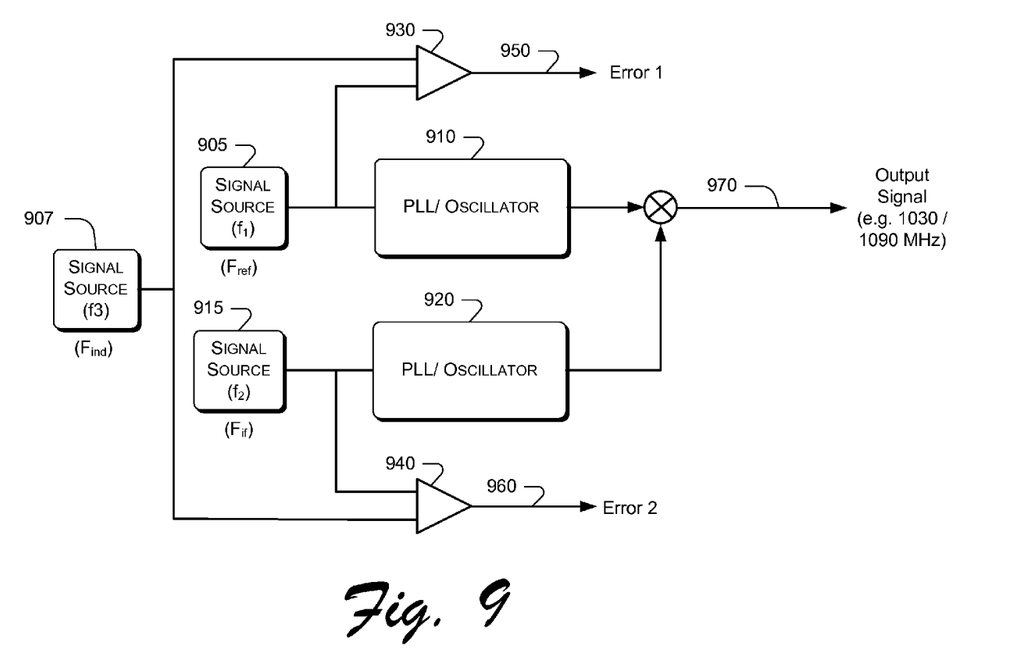
FIG. 9 illustrates exemplary approaches using multiple frequency inputs when an intermediate frequency is mixed with a local oscillator to determine whether frequency error of a transponder is within tolerable limits.

Turning to FIGS. 8 and 9, alternate approaches to determining whether frequency error of a transponder is within tolerable limits are illustrated. Also, FIG. 9 illustrates exemplary approaches using multiple frequency inputs when an intermediate frequency is mixed with a local oscillator to determine whether frequency error of a transponder is within tolerable limits.

A traditional method of generating an output signal such as a 1090 MHz signal is to directly generate it from using a Phase-Locked Loop (PLL)-based oscillator; an alternate method is to use a PLL oscillator generated LO source mixed with an IF source to generate the 1090 MHz. The IF may be generated using a Digital to Analog Converter (DAC) or a reference oscillator. In either case, directly measuring the frequency has been traditionally accomplished by using external equipment.

In one embodiment, the frequency stability of a Phase-Locked Loop (PLL) derived oscillator 910 is determined by the stability of the reference frequency 905 used to control the PLL, and the stability of the IF generation 920 will be determined by the stability of the clock 915 used by the DAC or by the input reference oscillator. This relationship between the (typically) lower frequency sources can be used to determine the stability of the resultant 1090 MHz signal 970 internal to a device such as a transponder without resorting to external test equipment if an independent frequency 907 is provided. A comparison between the frequency of the independent frequency 907 and the source frequencies 905, 915 used to generate the 1090 MHz signals therefore provides validation that the 1090 MHz signal 970 is within ±1 MHz.

In the case of direct generation of the 1090 MHz signal, the PLL reference may be divided by some value 'M' and the independent frequency divided by a value 'N' such that $F_{ref}/M = F_{ind}/N$. One possible implementation is to count both $F_{ref}$ and $F_{ind}$ until 'N' is reached, and then checking the value obtained by the "M counter" versus the expected value of 'M'. The difference is due to the frequency instabilities of the two frequencies used in this measurement. Temperature Controlled Crystal Oscillator (TCXO) technology is today able to produce clocks with stabilities ranging from ±10 to 50 ppm. In one embodiment, the required stability is 1 MHz/1090 MHz=917 ppm, so if all the error is assumed to be from $F_{ref}$, then the total error multiplied times 1090 MHz/ $F_{ref}$ needs to be less than 1 MHz.

An example calculation provides further explanation of an embodiment of the present invention. Let $F_{ref} = F_{ind} = 10$ MHz. The desired output frequency of 1090 MHz divided by 10 MHz=109, so the allowed error must be less than 1 MHz/109=9,174 Hz. If both $F_{ref}$ and $F_{ind}$ are specified to be 50 ppm oscillators, the worst case expected combined error is 1000 Hz (109 kHz error at 1090 MHz). If the frequency error exceeds 9,174 Hz at least one of the oscillators has drifted far from the specified, and in one embodiment, the assumption is that the drifting oscillator is the one responsible for produces $F_{ref}$.

In the case (such as that shown in FIG. 9) where the output signal (such as 1090 MHz) is generated using two frequency sources (an IF 920 and LO 910 mixed together to form an output 970) the same principle applies, the difference being that the combined error of two measurements must be less than 1 MHz.

As shown in FIG. 8, an example calculation provides further explanation an embodiment of the present invention. Let $F_{ref} = F_{ind} = 10$ MHz. $F_{if} = 100$ MHz and $F_{lo} = 1190$ MHz (so 1190−100 MHz=1090 MHz). 1190 MHz/10 MHz=119, so the resultant error at 1090 MHz (due to mixing) will be the measured error multiplied by 119. Since 100 MHz is used directly in this example, its error is multiplied by 1. This leads to a calculation that verifies compliance of the output frequency with a predetermined criterion such as an allowable 1 MHz variation: (Total error measured using $F_{ref}$ & $F_{ind}$) ×119+(Total error measured using $F_{if}$ and $F_{ind}$) must be less than 1 MHz. Note that the output of a DAC, if used, does not need to be directly measured if the DAC clock source frequency is available.

Receiver Sensitivity

RTCA/DO-181C defines a Minimum Triggering Level (MTL) as the minimum input power level that results in a 90% reply ratio if the interrogation signal has all nominal pulse spacings and widths and if the replies are the correct replies assigned to the interrogation format. Further, industry standards establish MTL as gauged by a particular system's reaction to received interrogations, signal types, and power profiles. For example, RTCA/DO-181C states that the MTL for All-Call interrogations for ATCRBS and ATCRBS/Mode S is −73 dBm±4 dB, the reply ratio must be at least 90% for All Call interrogations with signal levels between MTL and −21 dBm, and the reply ratio is not permitted to be more than 10% for interrogations with signal levels below −81 dBm.

Figure 3:
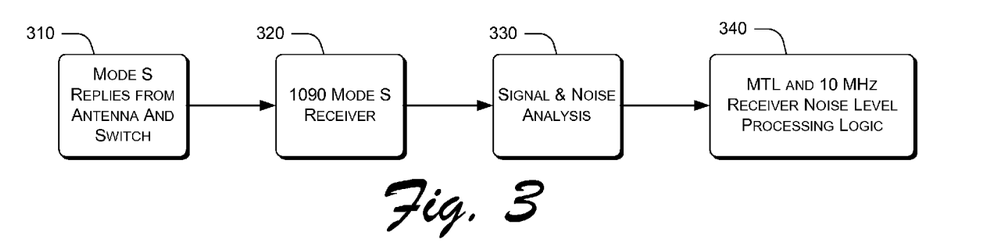
FIG. 3 illustrates a block diagram of an embodiment of the present invention for verifying receiver sensitivity.

In one implementation, MTL is represented as a digital threshold number within the receiver processing circuitry, but it may be possible for receiver sensitivity to be degraded beyond what is desired or acceptable within FAA regulations. Turning to FIG. 3, a process is illustrated for verifying receiver sensitivity. A signal such as a Mode S reply is transmitted 310 from the transponder antenna, and the signal received 320 by a receiver (such as a Mode S receiver) through means such as signal coupling or switch matrix routing, discussed above. A noise and sensitivity analysis is performed, and an MTL analysis is conducted within processing logic 330, 340.

In an embodiment, if at least one interrogation (e.g., from another aircraft) is properly decoded at MTL as determined by the processing circuitry then the receiver sensitivity is sufficient to permit MTL reception. Further, if the receiver noise level is measured to be lower than a predetermined MTL level then receiver components both passive and active may be verified to be in working order and within specifications.

Figure 4:
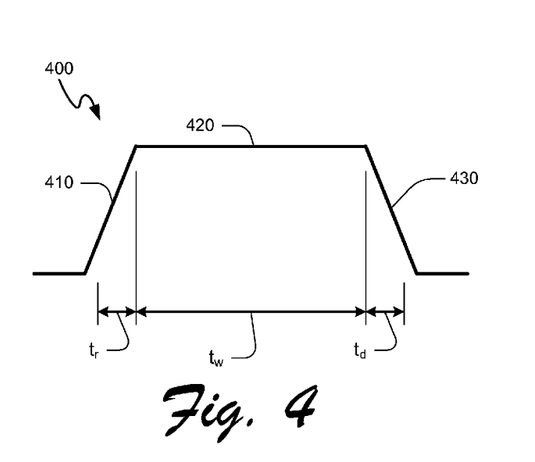
FIG. 4 shows an idealized trapezoidal signal profile, annotated to show specific signal features.

Turning to FIG. 4, a flowchart illustrates an embodiment of an analysis technique. After interrogations are received and decoded 460, a determination is made 470 whether at least one interrogation is decoded at or near MTL in multiple (for example, 10) flight legs. If this occurs, then the received signal is analyzed to determine 480 whether noise in the form of spurious pulses can be measured below MTL. If both of these tests are true, then MTL function and receiver function may be determined to be adequate 490. If either test 470, 480 fails, then MTL function and/or receiver sensitivity are determined to be inadequate 495.

Figure 5:
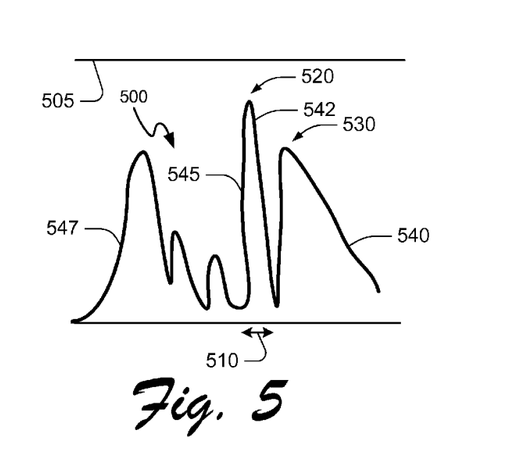
FIG. 5 illustrates spurious signals or noise pulses in relation to minimum triggering level.
Figure 6:
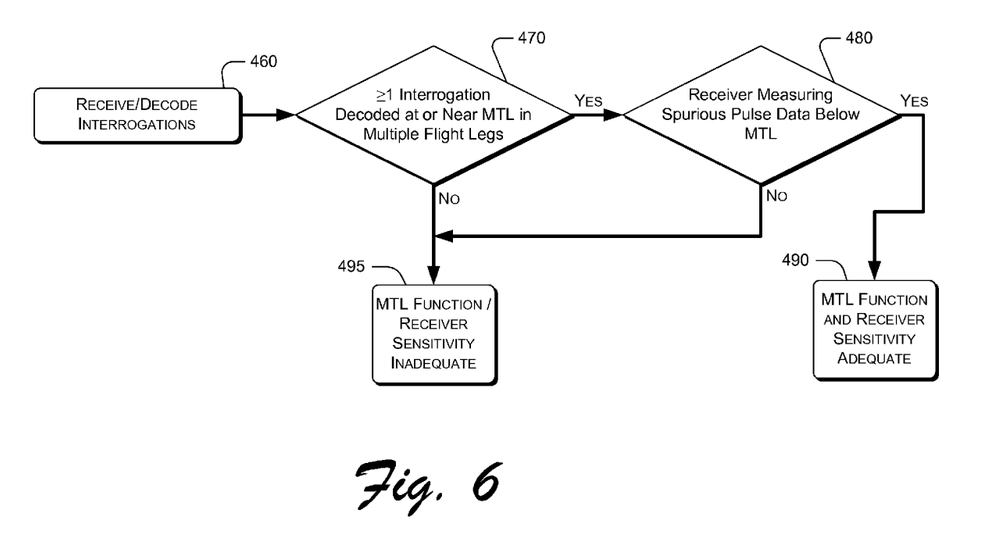
FIG. 6 illustrates one process flow of the present invention for determining whether a transponder's receiver sensitivity and minimum triggering level functions meet functional requirements.

Noise/spurious signal analysis may be better understood by referring to FIGS. 4 and 5. FIG. 4 is an idealized trapezoidal signal profile, annotated to show specific signal features. RTCA/DO-181C defines certain characteristic features (or shapes) of pulses, such as amplitude, rise time ($t_r$), a pulse width ($t_w$), and a decay time ($t_d$). For example, Mode S pulses must have the following characteristics: amplitude variation not exceeding 2 dB, rise time ($t_r$) less than 0.1 μs, decay time ($t_d$) less than 0.2 μs, and pulse width ($t_w$) must be 0.5 μs±0.05 μs. Comparing a signal to these known parameters allows for determination of whether spurious signals are occurring below MTL.

FIG. 5 illustrates spurious signals or noise pulses 500 in relation to a minimum triggering level (MTL) 505. Several factors may contribute to the identification of noise in the form of spurious pulse data at a level below MTL. For example, a signal rise time that exceeds 545 or lags 547 a predetermined rise time criterion; a signal decay time that exceeds 542 or lags 540 a predetermined decay time criterion; a signal pulse width 510 that exceeds or lags a predetermined pulse width criterion; a variation in signal pulse amplitude 520, 530 that exceeds or lags a predetermined signal pulse amplitude criterion; and a variation in signal phase that exceeds or lags a predetermined signal pulse phase criterion. Any or all of these conditions may be utilized to determine whether the signal being observed constitutes spurious pulse data at a lever below MTL.

Figure 7A:
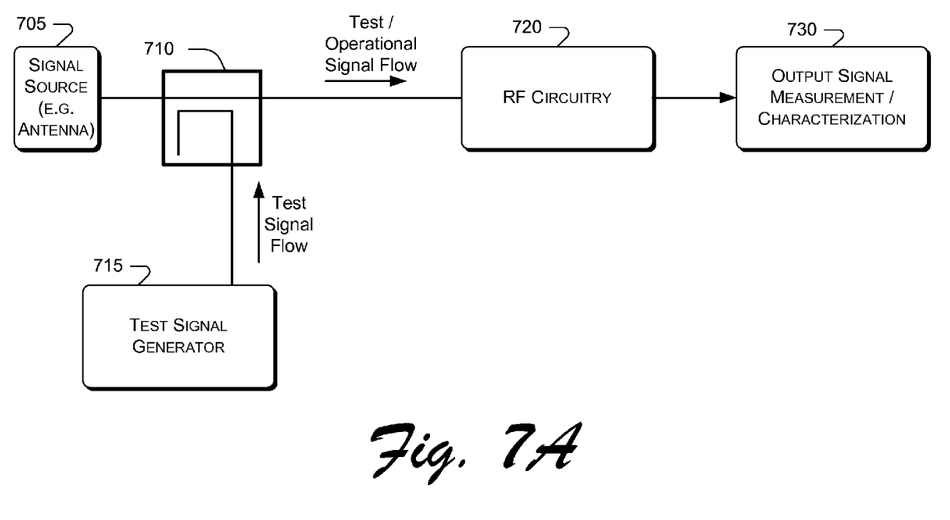
FIG. 7A shows a block diagram for an embodiment of the present invention where test signals may be injected to an input to a transponder circuit and an output of the transponder circuit may be sensed, characterized, or monitored for sensitivity testing purposes.

Turning to FIG. 7A, a block diagram is shown for an alternate embodiment of the present invention where test signals may be injected to an input to a transponder circuit and an output of the transponder circuit may be sensed, characterized, or monitored for sensitivity testing purposes. A signal source 705 (for instance, an antenna) provides inputs to RF Circuitry 720, which in turn generates 730 an output signal which may be further measured or characterized. A test signal generator 715 may provide a test signal through a coupler 710, allowing a test signal to propagate through the RF Circuitry 720 to the output 730 to be measured and quantified.

Figure 7B:
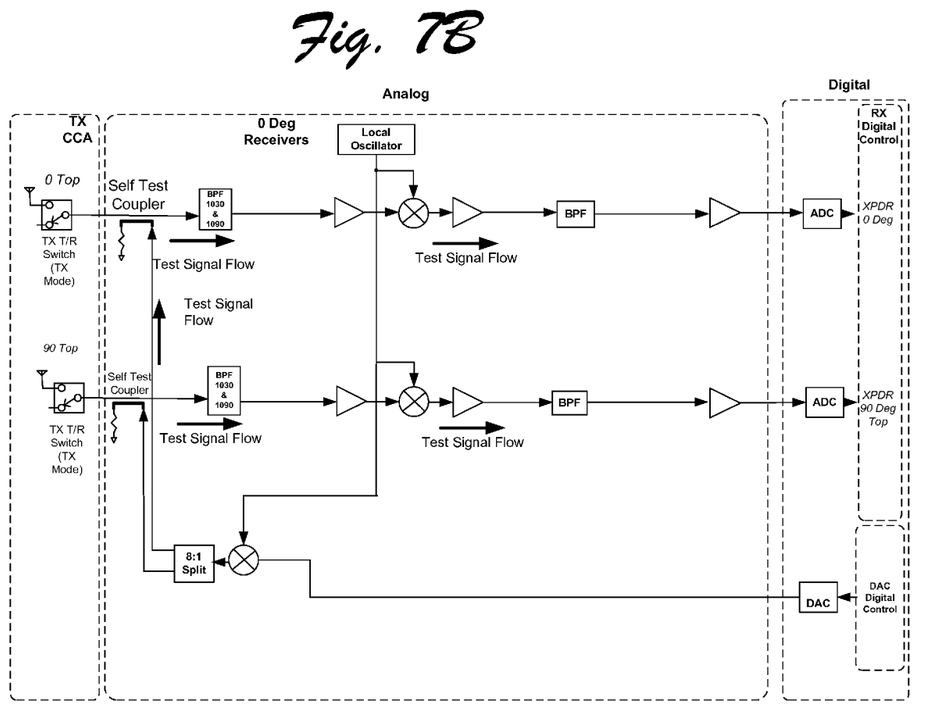
FIG. 7B shows a more detailed block for an embodiment of the present invention where test signals may be injected to inputs to a transponder circuit and outputs of the transponder circuit may be sensed, characterized, or monitored for sensitivity testing purposes.

Sensitivity of the transponder receiver(s) can be validated by following the following steps. During factory testing, a calibrated minimum sensitivity level signal is input into each receiver input (for example, through signal source 705), and the resultant received signal level measured 730. A self test signal is generated by means such as a digital to analog converter (DAC), with the amplitude varied until the received signal level matches that of the calibrated input for each particular input. During normal operation, sensitivity may then be validated by driving the test signal into each input at the sensitivity measurement level. FIG. 7B shows a more detailed block for an embodiment of the present invention where test signals may be injected to inputs to a transponder circuit and outputs of the transponder circuit may be sensed, characterized, or monitored for sensitivity testing purposes.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for monitoring performance of a transponder, the method comprising:
    synthesizing a signal for broadcast, the signal comprising air traffic control information;
    transmitting the signal from a directional antenna;
    sensing coupled electromagnetic signals from the antenna;
    routing the coupled electromagnetic signals to a receiver; and
    analyzing the coupled electromagnetic signals to determine whether the signals are in compliance with a predetermined performance range.

2. The method as disclosed in claim 1, wherein the predetermined performance range corresponds with transponder performance criteria indicating acceptable performance under United States FAA regulations.

3. The method as disclosed in claim 1, wherein the directional antenna is configured to transmit a substantially omindirectional signal.

4. The method as disclosed in claim 1, wherein analyzing the coupled electromagnetic signals further comprises analyzing an attenuation in the amplitude of the transmitted signal.

5. The method as disclosed in claim 1, wherein analyzing the coupled electromagnetic signals further comprises analyzing peak output power of the transponder.

6. The method as disclosed in claim 1, wherein analyzing the coupled electromagnetic signals further comprises:
    adjusting a gain parameter regarding the transmitted signal from the antenna;
    sensing a phase of the coupled electromagnetic signals;
    comparing the sensed phase to a transmitted phase to determine whether:
        a short-term phase drift has occurred;
        a long-term phase drift has occurred;
        or an abrupt phase change has occurred; and
    determining, based on said comparison, whether an amplitude of the transmitted signal is within a predetermined threshold range.

7. The method as disclosed in claim 1, further comprising formatting a record for storage, the record including a timestamp for record creation and at least one performance parameter characterizing transponder operating performance.

8. The method as disclosed in claim 7, wherein analyzing further comprises comparing a plurality of stored records to identify a transponder performance trend.

9. The method as disclosed in claim 8, wherein the transponder performance trend includes at least one of a frequency drift, a phase variation, an amplitude variation, or an output power variation.

10. The method as disclosed in claim 9, wherein analyzing further comprises comparing at least one of a frequency drift, a phase variation, an amplitude variation, or an output power variation to at least one reference frequency obtained by measuring a signal from a ground station.

11. The method as disclosed in claim 1, wherein analyzing the coupled electromagnetic signals further comprises determining whether the frequency of the transmitted signal is within a predetermined range.

12. A method for monitoring performance of a transponder, the method comprising:
    synthesizing a signal for transmission, the signal comprising air traffic control information;
    transmitting the signal from an antenna;
    sensing coupled electromagnetic signals from the antenna;
    analyzing the coupled electromagnetic signals to determine a transmitted signal frequency; and
    comparing the transmitted signal frequency to a reference signal frequency to determine whether the frequency range satisfies a predetermined performance threshold.

13. The method as disclosed in claim 12, wherein the frequency of the reference signal corresponds to a carrier frequency for received transponder interrogations.

14. The method as disclosed in claim 12, further comprising verifying the reference signal frequency, wherein:
    a plurality of signal measurements is obtained from at least one of a ground station and a second transponder;
    a mean frequency of the plurality of signal measurements is calculated or determined through execution of an algorithm; and
    the mean frequency is compared to the reference signal frequency to determine whether the reference signal frequency is within a predetermined average error range.

15. The method as disclosed in claim 14, wherein the predetermined average error range is 100 kHz.

16. The method as disclosed in claim 12, further comprising downconverting the coupled electromagnetic signals to an IF frequency.

17. The method as disclosed in claim 12, wherein the comparing the frequency range to the reference frequency further comprises obtaining a beat note from differential analysis of the transmitted signal frequency and the reference signal frequency.

18. A method for monitoring performance of a transponder, the method comprising:
- receiving a plurality of signals in a receiver, the signals comprising air traffic control information;
- analyzing the plurality of interrogation signals to obtain a measured noise performance criterion and a measured minimum triggering level (MTL) performance criterion;
- determining that the measured receiver sensitivity performance criterion and the measured MTL performance criterion are within respective predetermined thresholds when:
  - at least one interrogation signal was received at a predetermined minimum triggering level MTL within a predetermined number of flight legs at a predetermined minimum distance from own aircraft; and
  - a receiver is detecting spurious pulse data at a level below MTL.

19. The method as disclosed in claim 18, where the signals comprise received ATCRBS air traffic interrogations.

20. The method as disclosed in claim 18, where the signals comprise received Mode S air traffic interrogations.

21. The method as disclosed in claim 18, further comprising:
- synthesizing a plurality of Mode S replies for broadcast, the Mode S replies comprising air traffic control information;
- transmitting the Mode S replies from an antenna;
- sensing coupled electromagnetic signals from the antenna; and
- routing the coupled electromagnetic signals to the receiver.

22. The method as disclosed in claim 21, wherein the plurality of signals comprise the coupled electromagnetic signals.

23. The method as disclosed in claim 18, where detecting spurious pulse data at a level below MTL further comprises:
- finding no defined signal preamble in the plurality of signals within a predetermined period of time; and
- measuring invalid pulses below the predetermined MTL, further comprising observing in the plurality of signals at least one of:
  - a signal rise time that exceeds or lags a predetermined rise time criterion;
  - a signal decay time that exceeds or lags a predetermined decay time criterion;
  - a signal pulse width that exceeds or lags a predetermined pulse width criterion;
  - a variation in signal pulse amplitude that exceeds or lags a predetermined signal pulse amplitude criterion; and
  - a variation in signal phase that exceeds or lags a predetermined signal pulse phase criterion.

24. A method for monitoring performance of a transponder, the method comprising:
- inputting a predetermined calibration signal into a receiver input of an RF circuit coupled to the transponder, said calibration signal having a predetermined minimum sensitivity level;
- sampling an output from the RF circuit to obtain a calibrated reference response signal;
- coupling a self test signal to the receiver input of the RF circuit;
- measuring a test response signal from the output of the RF circuit;
- modifying the self test signal until the test response signal is within a predetermined range of the calibrated reference response signal; and
- determining, based on the modified self test signal, the calibration signal, the calibrated reference response signal, and the test response signal that a receiver sensitivity criterion is within a predetermined threshold.

25. The method as disclosed in claim 24, further comprising
- generating a second self test signal at the predetermined minimum sensitivity level;
- coupling the second self test signal to the receiver input of the RF circuit; and
- determining, based on the sampled output, whether the receiver sensitivity criterion is within a predetermined threshold.

26. The method as disclosed in claim 25, wherein the coupling of the second self test signal to the receiver input of the RF circuit occurs when the RF circuit is configured to a operational mode.

27. A method for monitoring performance of a transponder, the method comprising:
- generating a reference frequency and an independent frequency;
- determining a frequency error based on a calculated difference between the reference frequency and the independent frequency;
- computing an allowed error based on
  - a ratio of a maximum allowable output frequency deviation; and
  - a desired output frequency divided by the reference frequency; and
- determining that the output frequency is within an acceptable range when the frequency error is within the allowed error.

28. The method as disclosed in claim 27, wherein the frequency error further comprises a second error based on a calculated difference between a third frequency and the independent frequency.

* * * * *